L. FITZPATRICK & J. SCHINNELLER,
J. FITZPATRICK, admr'x of L. FITZPATRICK, dec'd.
Chain-Machine.
No. 8,485. Reissued Nov. 12, 1878.
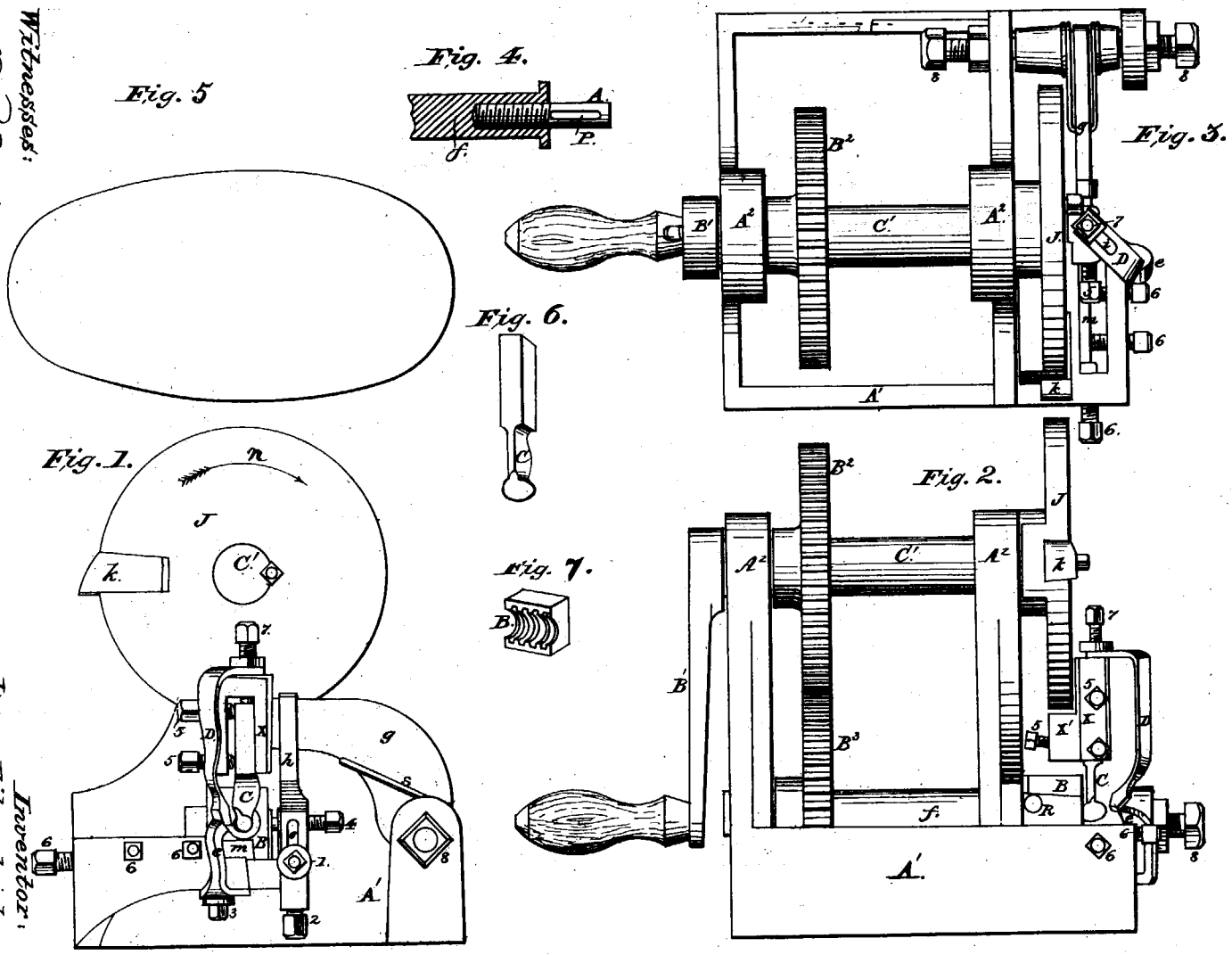
Witnesses:
T. C. Bruchs
O. E. Duffz
Inventor:
Jane Fitzpatrick, administratrix
and, Jacob Shinneller
by Chas. G. Page.
Attorney.
N. PETERS, PHOTO-LITHOGRAPHER, WASHINGTON, D. C.

UNITED STATES PATENT OFFICE.

JANE FITZPATRICK, OF WHEELING, WEST VIRGINIA, ADMINISTRATRIX OF LUKE FITZPATRICK, DECEASED, AND JACOB SCHINNELLER, OF PITTSBURG, PENNSYLVANIA.

IMPROVEMENT IN CHAIN-MACHINES.

Specification forming part of Letters Patent No. 73,518, dated January 21, 1868; Reissue No. 8,485, dated November 12, 1878; application filed May 31, 1878.

*To all whom it may concern:*

Be it known that LUKE FITZPATRICK, of Temperanceville, county of Allegheny, State of Pennsylvania, deceased, (late of Benwood, county of Marshall, State of West Virginia,) and JACOB SCHINNELLER, of Pittsburg, (formerly of Temperanceville,) county of Allegheny, State of Pennsylvania, did invent a new and useful Improvement in Machines for Making Chain-Links, of which the following is a full and exact description, reference being had to the accompanying drawings and the letters and figures of reference marked thereon.

This invention relates to an improvement in machines for constructing link-blanks for chains; and consists in the combination of a revolving oval mandrel, combined with a bending mechanism and a cutter, so arranged and operating with relation to each other that the link-blanks formed thereby are provided at their larger end with the necessary metal for the required lap for welding.

To enable others skilled in the art to make and use their invention, its construction and operation will now be described.

In the accompanying drawings, which form part of this specification, Figure 1 is a front elevation of the improved link-machine. Fig. 2 is a side elevation of the same. Fig. 3 is a plan or top view. Fig. 4 represents a side view of the mandrel around which the link is formed, and shows one way of securing it to the shaft which revolves it. Fig. 5 represents an enlarged end view of the mandrel. Fig. 6 is a perspective view of the cutter. Fig. 7 is a perspective view of one-half of the spiral guide in which the mandrel revolves.

In the drawings, $A^1$ represents the frame of the machine. $A^2$ are the supports for the shaft C′. To this shaft is attached the driving-crank $B^1$. The shaft C′ is provided with disk J, which is provided with projecting point *k* for operating the lever *g* and the parts attached thereto. On the shaft C′ is also secured a wheel, $B^2$, which gears into the wheel $B^3$ on the shaft *f*, in the end of which is secured the mandrel A, the contour of which corresponds to the form of the link-blank prior to its being separated from the coil—that is to say, the mandrel A is of an elongated oval form, as shown in Fig. 5, the larger diameter being at the scarfed ends of the link, to admit of the desired amount of lap in welding. This mandrel is provided with a recess, P. (See Fig. 4.) The width of this recess must be about equal to the diameter of the iron from which the link is formed. The mandrel A revolves in the spiral guide B, said guide being represented in Fig. 7 as made in two parts, in order to show the interior. The guide B is held in position by means of the set-screw 4. The lever marked *g* is pivoted to the frame $A^1$ by means of two set-screws marked 8. This lever *g* is provided with a head-piece marked *x*, in which the cutter marked C is secured by means of the set-screws 5. To the head-piece *x* is secured the set D by means of the set-screw 7. This set is provided with a slot, *i*, for the purpose of adjustment. The set D is so constructed that it will yield to the guide *e*, which is held in the desired position by the set-screw 3. The lever *g* is provided with an adjustable stop marked *h*, which is provided with a slot, *o*, and is held in position by means of the set-screws 1 and 2. The lever *g* is thrown up against the stop *h* by means of the spring *s*. *m* represents an anvil, adjusted and held by screws 6, and used in connection with the cutter C for cutting off the link-blanks. R represents the feed-opening, which leads into a corresponding opening in the spiral guide B.

As the form, construction, and arrangement of the various parts and the relation they bear to each other will be readily understood by the skillful mechanic from the above description, and by reference to the accompanying drawings, we will, without further description of its construction, proceed to describe its operation, which is as follows:

Power is applied to the crank $B^1$ so as to turn the shaft C′ and its wheel $B^2$ and disk J in the direction indicated by the arrow *n*. The motion of the wheel $B^2$ will revolve the wheel $B^3$, shaft *f*, and mandrel A in an opposite direction. Having thus imparted motion to the machine, the iron for forming the link-blank is fed in at the opening marked R, and will pass through the opening in the guide B into the recess P in the mandrel A, and the revolution of the mandrel A will draw the iron in, and the spiral in the guide B will cause it to wind spirally around the mandrel in such manner as to give the desired form for the link, and cause the iron thus formed to pass out at the end of the guide B, and the revolution of the disk J will bring the point *k* in contact with part *x'* of the head-piece *x* of lever *g*, and press it down, thereby causing the cutter C to sever a blank at each revolution of the mandrel A. The spring-set D, which is guided by the guide marked *e*, gives the desired lap for welding, and regulates the size of the opening in the link. This set D is adjustable as described, and may be brought into action, if desired, a little before the cutter C cuts off the blank. After each link is cut off the spring *s* will throw the lever *g* and the parts attached thereto up, so as to allow another link to pass out under the cutter.

Having thus described the nature, construction, and operation of the improvement hereinbefore described, we claim—

1. In a machine for forming chain-links, a revolving oval mandrel, (when viewed in cross-section,) in combination with a bending mechanism and a cutter, so arranged and operating with relation to each other that the link will be severed from the forming links on the mandrel at the larger end of the blank, substantially as herein described.

2. In a machine for forming link-blanks, a continuous revolving oval mandrel, (when viewed in cross-section,) in combination with a bending mechanism and a means for separating and advancing the bar as it is coiled on the mandrel, substantially as herein described.

3. In a machine for forming link-blanks, a continuous revolving oval mandrel, (when viewed in cross-section,) in combination with guide B, set D, guide *e*, and cutter, as herein described and set forth.

4. The spring-set D and guide *e*, in combination with the cutter C, constructed, arranged, and operating substantially as herein described, and for the purposes set forth.

5. In a machine for forming link-blanks, the mandrel A, having a recess, P, in combination with a guide, B, provided with opening R, substantially as herein described, and for the purpose set forth.

JANE FITZPATRICK,
*Administratrix of Luke Fitzpatrick, deceased.*
JACOB SCHINNELLER.

Witnesses as to signature of Jane Fitzpatrick:

JNO. DEVER,
W. P. BROWN.

Witnesses as to signature of Jacob Schinneller:

A. C. JOHNSTON,
W. F. MURDOCK.